(12) United States Patent
Takahashi et al.

(10) Patent No.: US 9,494,049 B2
(45) Date of Patent: Nov. 15, 2016

(54) TURBOCHARGER

(71) Applicant: IHI Corporation, Tokyo (JP)

(72) Inventors: Masashige Takahashi, Tokyo (JP); Yukio Takahashi, Tokyo (JP)

(73) Assignee: IHI Corporation, Tokyo (JP)

( * ) Notice: Subject to any disclaimer, the term of this patent is extended or adjusted under 35 U.S.C. 154(b) by 301 days.

(21) Appl. No.: 14/151,794

(22) Filed: Jan. 9, 2014

(65) Prior Publication Data

US 2014/0127051 A1 May 8, 2014

Related U.S. Application Data

(63) Continuation of application No. PCT/JP2012/065700, filed on Jun. 20, 2012.

(30) Foreign Application Priority Data

Jul. 12, 2011 (JP) .................................. 2011-153466

(51) Int. Cl.
 *F01D 25/16* (2006.01)
 *F01D 25/18* (2006.01)
 (Continued)

(52) U.S. Cl.
 CPC ............ *F01D 25/186* (2013.01); *F01D 25/166* (2013.01); *F01D 25/18* (2013.01); *F02B 39/14* (2013.01); *F02C 6/12* (2013.01); *F16C 17/18* (2013.01); *F16C 32/0629* (2013.01); *F16C 33/105* (2013.01); *F05D 2220/40* (2013.01); *F05D 2240/53* (2013.01); *F05D 2260/604* (2013.01); *F05D 2260/607* (2013.01); *F16C 2360/24* (2013.01)

(58) Field of Classification Search
 CPC ..... F01D 25/166; F16C 17/18; F16C 33/106
 See application file for complete search history.

(56) References Cited

U.S. PATENT DOCUMENTS 5,993,173 A * 11/1999 Koike .................. F01D 25/166
 417/407

FOREIGN PATENT DOCUMENTS

CN 2714811 Y 8/2005
CN 201209464 Y 3/2009
(Continued)

OTHER PUBLICATIONS

Combined Chinese Office Action and Search Report issued Jun. 3, 2015 in Patent Application No. 201280033959.4 (with partial English language translation).
(Continued)

*Primary Examiner* — Patrick Hamo
(74) *Attorney, Agent, or Firm* — Oblon, McClelland, Maier & Neustadt, L.L.P.

(57) ABSTRACT

A turbocharger includes a semi-floating metal. The semi-floating metal is provided with a supply opening configured to supply oil to an inner bearing section. The turbocharger is provided with: an oil supply path which extends from inside of a bearing housing to the supply opening, and feeds the oil to be supplied to the inner bearing section; a removal section which changes a flowing direction of the oil supplied from an upstream side to separate minute foreign matter in the oil; and a conveyance path and a retaining region which collect the minute foreign matter separated by the removal section so as to prevent the minute foreign matter from mixing again with the oil flowing toward the supply opening.

5 Claims, 8 Drawing Sheets

(51) Int. Cl.
*F02B 39/14* (2006.01)
*F02C 6/12* (2006.01)
*F16C 32/06* (2006.01)
*F16C 17/18* (2006.01)
*F16C 33/10* (2006.01)

(56) References Cited

FOREIGN PATENT DOCUMENTS

| CN | 101550864 A | 10/2009 |
|---|---|---|
| EP | 0 794 319 A1 | 9/1997 |
| JP | 09-242554 | 9/1997 |
| JP | 2010-096120 | 4/2010 |
| WO | WO 2008/059371 A2 | 5/2008 |
| WO | WO 2011/058627 A1 | 5/2011 |

OTHER PUBLICATIONS

Extended European Search Report issued Jul. 27, 2015 in European Patent Application No. 1281-1217.4.
International Search Report mailed Aug. 7, 2012 for PCT/JP2012/065700, filed Jun. 20, 2012 with English Translation.
International Written Opinion mailed Aug. 7, 2012 for PCT/JP2012/065700, filed Jun. 20, 2012.

\* cited by examiner

TURBOCHARGER

CROSS REFERENCE TO RELATED APPLICATIONS

This application is a continuation application of International Application No. PCT/JP2012/065700, filed on Jun. 20, 2012, which claims priority to Japanese Patent Application No. 2011-153466, filed on Jul. 12, 2011, the entire contents of which are incorporated by references herein.

BACKGROUND OF THE INVENTION

1. Field of the Invention

The present invention relates to a turbocharger which includes a turbine and a compressor.

2. Description of the Related Art

A turbocharger including a turbine and a compressor has been widely used as a supercharger for improving a performance of an internal combustion engine. In the turbocharger, a turbine wheel (turbine impeller) constituting the turbine and a compressor wheel (compressor impeller) constituting the compressor are connected to each other by a rotating shaft. An exhaust gas from the internal combustion engine is fed into the turbine side. The exhaust gas thus fed rotates the turbine wheel and thereby rotates the compressor wheel. Air is forced to flow into a cylinder of the internal combustion engine by the rotation of the compressor wheel, whereby a gas pressure inside the cylinder is raised and virtual displacement is increased.

The above-described turbocharger needs to rotate and drive the turbine and the compressor at a high speed. As a consequence, the rotating shaft is also rotated at a high speed. It is therefore extremely important to ensure lubrication between the rotating shaft and a housing that houses the rotating shaft. Japanese Patent Application Laid-Open Publication No. 2010-96120 (PTL 1) cited below proposes a bearing device for a turbocharger, which is intended to remove foreign matter in oil that serves as a lubricant.

In the bearing device of PTL 1, a detour is provided in the vicinity of an oil inlet inside a housing and a filter is disposed in the detour. Foreign matter in the oil is removed by the filter, and the oil from which the foreign matter is removed is then supplied from the inlet to rolling bearings.

SUMMARY OF THE INVENTION

In the related art described above, the rolling bearings hold the rotating shaft. Accordingly, a particular problem seems not to occur even when the oil is supplied through the detour where the filter is disposed. On the other hand, the application of the above-described related art without alteration is not preferable when the type of the bearing is changed to a fluid bearing which is a plain bearing.

A fluid bearing includes a bearing member such as a semi-floating metal bearing disposed between a rotating shaft and a housing, and is designed to form an oil film by forcing oil into the clearance between the housing and the bearing member at a high pressure, and to form an oil film by forcing the oil into the clearance between the rotating shaft and the bearing member at a high pressure. The formation of the oil films between these components as described above enables the rotating shaft to rotate at a high speed.

If a filter as in the related art is provided for such a fluid bearing, the filter causes a reduction of pressure, which may complicate the formation of the oil films between the components. In order to supply the oil at a sufficient pressure to the fluid bearing, a supply pressure of the oil has to be increased or a screen of the filter has to be made coarse. Nonetheless, the installation of a specific device for increasing the supply pressure of the oil should be avoided. For this reason, the increase range in the supply pressure of the oil is limited. On the other hand, if the screen of the filter is made coarse, then foreign matter is more likely to flow into the fluid bearing side. In this context, the filter method is not always effective in order to remove the foreign matter from the oil inside the turbocharger that employs the fluid bearing. In addition, if the filter method is employed, it is necessary to conduct maintenance work such as the replacement or cleaning of the filter due to the necessity of disposing the filter in an oil supply path.

In the case of the fluid bearing, it is not preferable to provide the filter on the oil supply path in the fluid bearing, but the necessity of removing the foreign matter from the oil is higher than in the case of the rolling bearing. The fluid bearing is configured to exert the function as the bearing by use of the oil films formed between the components. Accordingly, each clearance between the components is so small that the entry of even minute foreign matter may cause a trouble. To be more precise, the minute foreign matter moving between the components may damage opposed surfaces of the components or the minute foreign matter stuck between the components may block a flow of the oil between the components. The occurrence of these phenomena may lead to seizure due to the shortage of the oil or the locking of the rotating shaft, and may cause a reduction in supercharging pressure or the occurrence of abnormal noise from the turbocharger.

The present invention has been made in view of the above-mentioned problems. An object of the present invention is to provide a turbocharger which employs a fluid bearing to support a rotating shaft that connects a turbine and a compressor to each other, and is capable of minimizing the entry of minute foreign matter into the fluid bearing without blocking a function of the fluid bearing.

An aspect of the present invention is a turbocharger including: a turbine wheel constituting a turbine; a compressor wheel constituting a compressor; a rotating shaft connecting the turbine wheel and the compressor wheel to each other; a housing which houses at least the rotating shaft; and a semi-floating metal bearing forming a fluid bearing between the rotating shaft and the housing. The semi-floating metal bearing is provided with a supply opening configured to supply oil to an inner bearing section formed between the semi-floating metal bearing and the rotating shaft. The turbocharger is provided with an oil supply path extending from inside of the housing to the supply opening and configured to feed the oil to be supplied to the inner bearing section. In addition, the oil supply path is provided with a removal section configured to change a flowing direction of the oil supplied from an upstream side to separate minute foreign matter in the oil. The turbocharger is provided with a collecting section configured to collect the minute foreign matter separated by the removal section so as to prevent the minute foreign matter from mixing again with the oil flowing toward the supply opening.

In the turbocharger, the collecting section may include: a retaining region configured to retain the minute foreign matter separated by the removal section, so as to prevent the minute foreign matter from mixing again with the oil flowing toward the supply opening; and a conveyance path configured to move the minute foreign matter, separated by the removal section, from the removal section to the retaining region. The conveyance path may be joined to the removal section at a position different from a main flow path on which the oil flows from the removal section toward the supply opening.

In the turbocharger, an oil reservoir space configured to temporarily retain the oil may be formed between the housing and the semi-floating metal bearing. In addition, the retaining region and the conveyance path may be formed in the oil reservoir space.

In the turbocharger, the retaining region may be formed below the removal section and the supply opening.

In the turbocharger, a guide wall surface configured to guide the minute foreign matter to the conveyance path may be formed between the removal section and the supply opening.

In the turbocharger, the removal section may include a separation wall surface opposed to the flow of the oil supplied from the upstream side.

In the turbocharger, the separation wall surface may be formed on an outer peripheral surface of the semi-floating metal bearing.

In the turbocharger according to claim 7, an oil reservoir space configured to temporarily retain the oil may be formed between the housing and the semi-floating metal bearing. The housing may be provided with an upstream side supply opening configured to supply the oil to the oil reservoir space. The separation wall surface may be formed by locating the upstream side supply opening and the supply opening at different positions.

The above-mentioned configurations can be combined with one another unless the configurations are not technically incompatible with one another. When the configurations are combined, their combinations can exert the operations and effects that are intrinsic to the respective configurations.

According to the present invention, it is possible to provide a turbocharger which employs a fluid bearing to support a rotating shaft that connects a turbine and a compressor to each other, and is capable of minimizing the entry of minute foreign matter into the fluid bearing without blocking a function of the fluid bearing.

DESCRIPTION OF THE PREFERRED EMBODIMENTS

Figure 1:
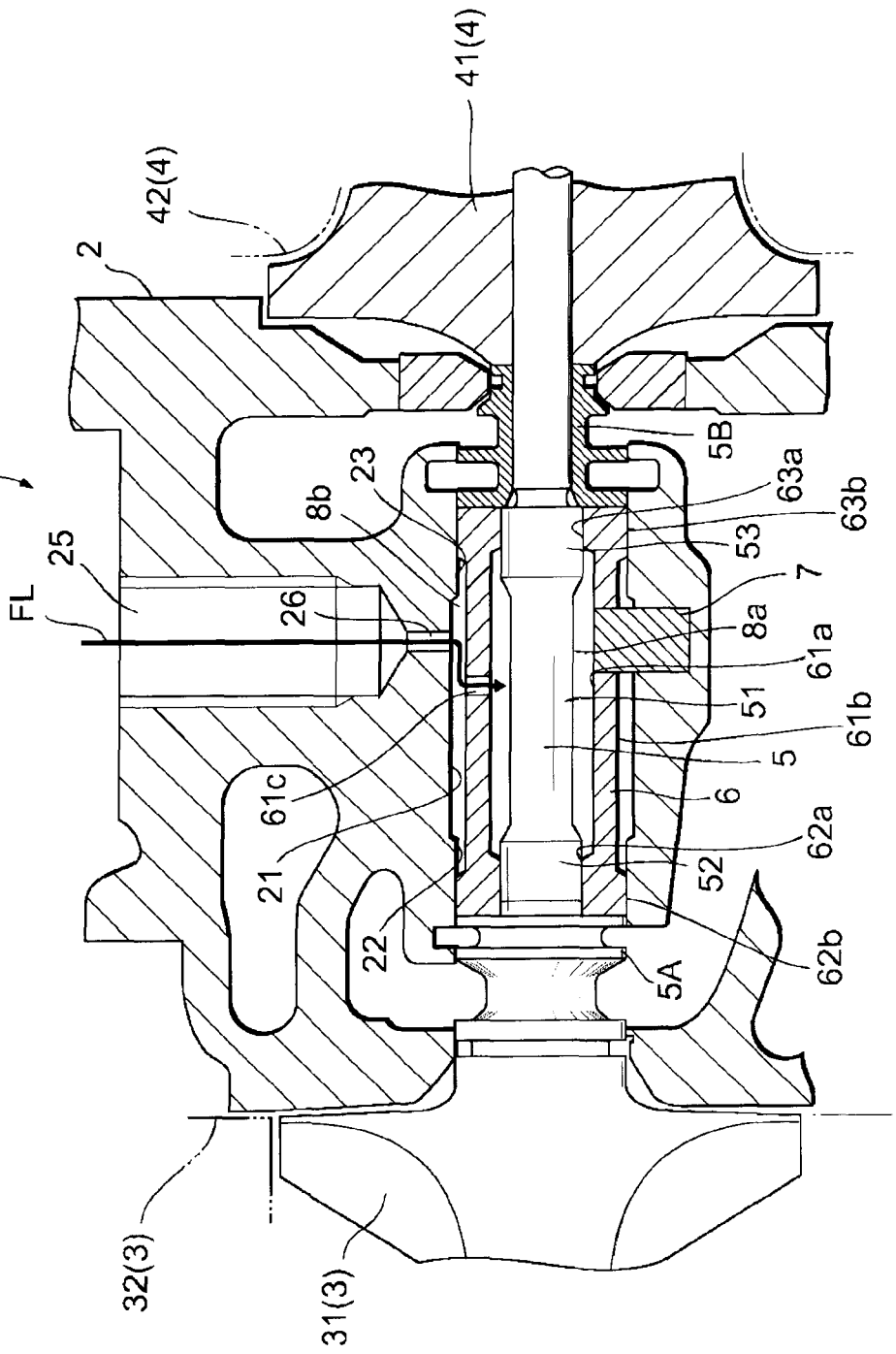
FIG. 1 is a schematic cross-sectional view of a turbocharger which is an embodiment of the present invention.

An embodiment of the present invention will be described below with reference to the accompanying drawings. To make the descriptions understood easily, the same constituents in the drawings are denoted by the same reference numerals as much as possible and overlapped descriptions will be omitted.

A turbocharger representing an embodiment of the present invention will be described with reference to FIG. 1. FIG. 1 is a schematic cross-sectional view of a turbocharger TC which is the embodiment of the present invention. As shown in FIG. 1, the turbocharger TC of the embodiment includes a bearing housing 2, a turbine 3 provided with a turbine wheel (turbine impeller) 31, a compressor 4 provided with a compressor wheel (compressor impeller) 41, a rotating shaft 5, and a semi-floating metal bearing 6.

The turbine wheel 31 is a key component that constitutes the turbine 3, and is housed in a turbine housing 32. The compressor wheel 41 is a key component that constitutes the compressor 4, and is housed in a compressor housing 42. The turbine wheel 31 and the compressor wheel 41 are connected to each other by the rotating shaft 5. The rotating shaft 5 is rotatably held by the semi-floating metal bearing 6 interposed between the bearing housing 2 and the rotating shaft 5.

The turbine housing 32 includes a turbine side scroll chamber which is not clearly shown in FIG. 1. The turbine side scroll chamber is a chamber which houses the turbine wheel 31. The turbine side scroll chamber is provided with an inlet port for supplying an exhaust gas from an internal combustion engine to the inside of the chamber, and an outlet port for discharging the supplied exhaust gas. The turbine wheel 31 is rotated by the exhaust gas supplied from the inlet port, whereby the rotating shaft 5 is rotated and driven.

The compressor housing 42 includes a compressor side scroll chamber which is not clearly shown in FIG. 1. The compressor side scroll chamber is a chamber which houses the compressor wheel 41. The compressor side scroll chamber is provided with an inlet port for supplying air to the inside of the chamber, and an outlet port for feeding the supplied air to the internal combustion engine. The compressor wheel 41 is rotated in response to the rotating shaft 5 that is rotated and driven. With the rotation of the compressor wheel 41, the air is taken in from the inlet port and is compressed inside the compressor side scroll chamber. The compressed air is fed from the outlet port to the internal combustion engine.

The bearing housing 2 houses the semi-floating metal bearing 6 which rotatably holds the rotating shaft 5. The semi-floating metal bearing 6 is a component which has a substantially cylindrical shape. The semi-floating metal bearing 6 is fixed to the bearing housing 2 by use of a thrust pin 7. The semi-floating metal bearing 6 is fixed to the bearing housing 2 in such a manner as to be movable in a radial direction of the semi-floating metal bearing 6 but not to be movable or rotatable in its axial and rotational directions.

The semi-floating metal bearing 6 is formed as a member having stepped shapes on both of its inner and outer peripheral surfaces. The inner peripheral surface of the semi-floating metal bearing 6 includes: an inside small diameter portion 62a formed on one end; an inside small diameter portion 63a formed on the other end; and an inside large diameter portion 61a formed at a central portion between the inside small diameter portion 62a and the inside small diameter portion 63a. An inner diameter of the inside small diameter portion 62a and an inner diameter of the inside small diameter portion 63a are formed substantially equal to each other. The inside large diameter portion 61a is formed to have an inner diameter which is larger than the inner diameters of the inside small diameter portion 62a and the inside small diameter portion 63a.

The outer peripheral surface of the semi-floating metal bearing 6 includes: an outside large diameter portion 62b formed on one end; an outside large diameter portion 63b formed on the other end; and an outside small diameter portion 61b formed at a central portion between the outside large diameter portion 62b and the outside large diameter portion 63b. An outer diameter of the outside large diameter portion 62b and an outer diameter of the outside large diameter portion 63b are formed substantially equal to each other. The outside small diameter portion 61b is formed to have an outer diameter which is smaller than the outer diameters of the outside large diameter portion 62b and the outside large diameter portion 63b.

The rotating shaft 5 is inserted in the inner peripheral surface side of the semi-floating metal bearing 6. A small diameter portion 51, and large diameter portions 52 and 53 provided in such a manner as to sandwich the small diameter portion 51, are formed at part of the rotating shaft 5 that is inserted in the inner peripheral surface side of the semi-floating metal bearing 6. Each of the large diameter portions 52 and 53 is formed to have an outer diameter which is larger than an outer diameter of the small diameter portion 51. The large diameter portion 52 is located at a position opposed to the inside small diameter portion 62a and the large diameter portion 53 is located at a position opposed to the inside small diameter portion 63a. A clearance between the large diameter portion 52 and the inside small diameter portion 62a is extremely small, and an oil film is formed by forcing oil at a high pressure into the small clearance. Similarly, a clearance between the large diameter portion 53 and the inside small diameter portion 63a is extremely small, and an oil film is formed by forcing the oil at the high pressure into the small clearance.

A diameter enlarged portion 5A is provided between the large diameter portion 52 of the rotating shaft 5 and the turbine wheel 31. The diameter enlarged portion 5A is formed integrally with the rotating shaft 5 in such a manner as to be in intimate contact with the large diameter portion 52. The oil forming the oil film by being forced into the clearance between the large diameter portion 52 and the inside small diameter portion 62a passes through a gap between the diameter enlarged portion 5A and the semi-floating metal bearing 6 as well as a gap between the diameter enlarged portion 5A and the bearing housing 2, and flows back to an oil pan which is not clearly shown in the drawing.

A thrust cup member 5B is provided between the large diameter portion 53 of the rotating shaft 5 and the compressor wheel 41. The thrust cup member 5B is fitted into the rotating shaft 5 in such a manner as to be in intimate contact with the large diameter portion 53. The oil forming the oil film by being forced into the clearance between the large diameter portion 53 and the inside small diameter portion 63a passes through a gap between the thrust cup member 5B and the semi-floating metal bearing 6 as well as a gap between the thrust cup member 5B and the bearing housing 2, and flows back to the oil pan which is not clearly shown in the drawing.

As described above, the small diameter portion 51 is provided between the large diameter portion 52 and the large diameter portion 53 of the rotating shaft 5. Meanwhile, the inside large diameter portion 61a is provided between the inside small diameter portion 62a and the inside small diameter portion 63a of the semi-floating metal bearing 6. Accordingly, the small diameter portion 51 of the rotating shaft 5 and the inside large diameter portion 61a of the semi-floating metal bearing 6 are respectively arranged at such positions to face each other, and an inside oil reservoir space 8a is thus formed.

A supply opening 61c is formed in the semi-floating metal bearing 6 in order to supply the oil to the inside oil reservoir space 8a. The supply opening 61c is formed penetrating the semi-floating metal bearing 6 from the inside large diameter portion 61a to the outside small diameter portion 61b. In this embodiment, the supply opening 61c is formed in such a manner as to be located on the opposite side of the rotating shaft 5 from the thrust pin 7, or in other words, to be located above the rotating shaft 5 in FIG. 1.

Housing inner walls 21, 22, and 23 are formed at portions of the bearing housing 2 which the semi-floating metal bearing 6 is housed in. The housing inner wall 22 and the housing inner wall 23 are formed while interposing the housing inner wall 21 in between.

The housing inner wall 22 forms a circular cross section and a part of the cross section is provided facing the outside large diameter portion 62b of the semi-floating metal bearing 6 while the rest of the cross section is provided facing the outside small diameter portion 61b of the semi-floating metal bearing 6. A clearance between the housing inner wall 22 and the outside large diameter portion 62b is extremely small, and an oil film is formed by forcing the oil at the high pressure into the small clearance.

The housing inner wall 23 forms a circular cross section with the diameter equal to that of the housing inner wall 22, and a part of the cross section is provided facing the outside large diameter portion 63b of the semi-floating metal bearing 6 while the rest of the cross section is provided facing the outside small diameter portion 61b of the semi-floating metal bearing 6. A clearance between the housing inner wall 23 and the outside large diameter portion 63b is extremely small, and an oil film is formed by forcing the oil at the high pressure into the small clearance.

The housing inner wall 21 forms a circular cross section with the diameter larger than those of the housing inner walls 22 and 23, and is provided at a position to face the outside small diameter portion 61b of the semi-floating metal bearing 6. As a consequence, an outside oil reservoir space 8b is formed between the housing inner wall 21 and the outside small diameter portion 61b.

A housing side supply opening 26 (an upstream side supply opening) for supplying the oil to the outside oil reservoir space 8b is formed in the bearing housing 2. An oil feed passage 25 is formed in the bearing housing 2 so as to communicate with the housing side supply opening 26. The oil with the high pressure is supplied to the oil feed passage 25, passed through the housing side supply opening 26, and supplied to the outside oil reservoir space 8b.

The housing side supply opening 26 is formed at a position opposed to the outside small diameter portion 61b of the semi-floating metal bearing 6. The supply opening 61c formed in the semi-floating metal bearing 6 and the housing side supply opening 26 are formed in different positions so as not to be opposed to each other. As a consequence, the oil supplied to the outside oil reservoir space 8b hits the outside small diameter portion 61b of the semi-floating metal bearing 6, whereby a flowing direction of the oil is changed and the oil flows toward the supply opening 61c. The above-mentioned flow of the oil forms an oil supply path FL which extends from the oil feed passage 25 to the inside oil reservoir space 8a. In this embodiment, minute foreign matter contained in the oil is prevented from going into the semi-floating metal bearing 6 by utilizing the above-mentioned change in the direction of the oil on the oil supply path FL.

Figure 2:
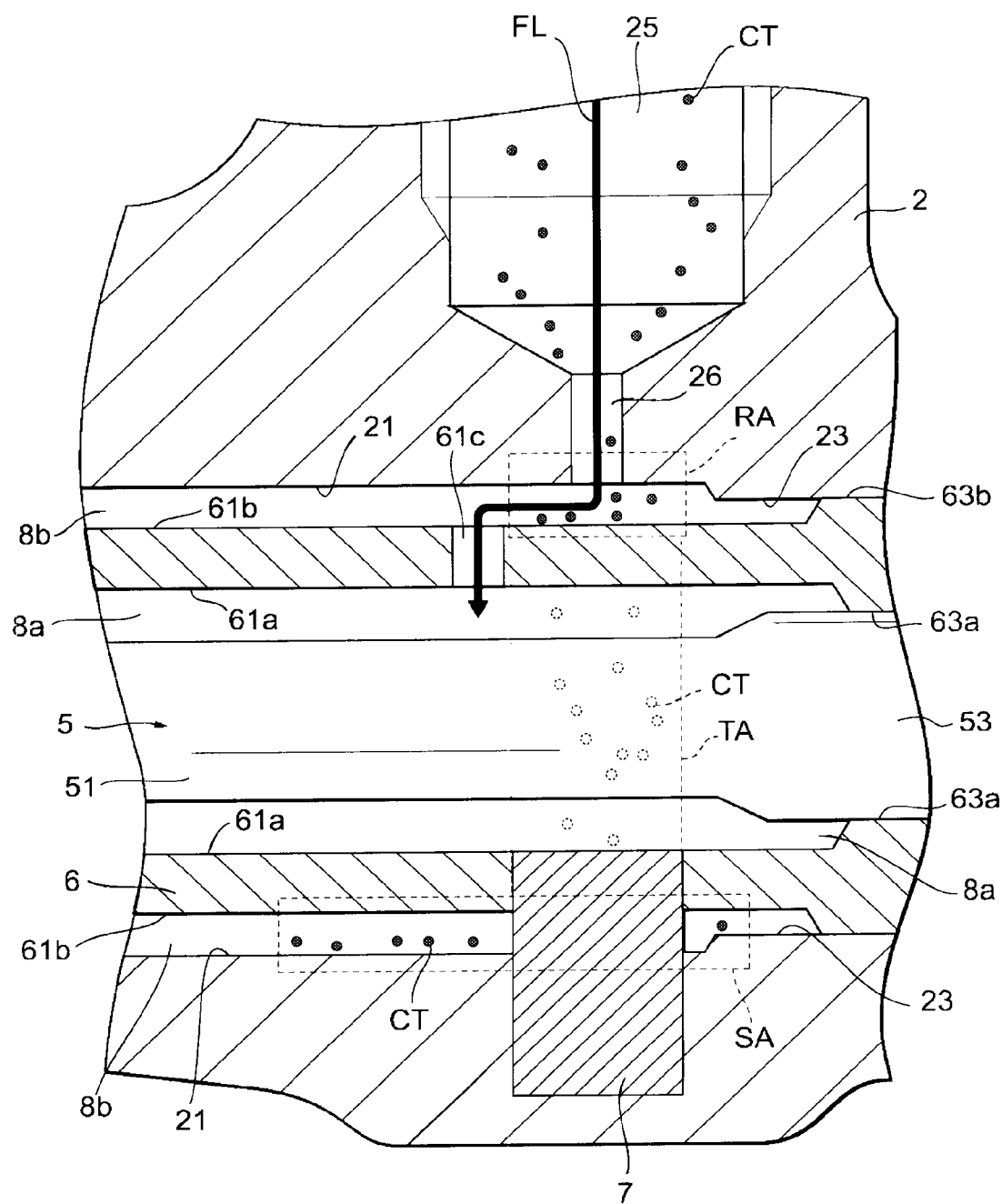
FIG. 2 is an enlarged cross-sectional view enlarging a bearing section in FIG. 1.

Next, how the minute foreign matter is removed will be described in detail with reference to FIG. 2. FIG. 2 is an enlarged cross-sectional view enlarging a bearing section in FIG. 1. As shown in FIG. 2, the oil supplied from the oil feed passage 25 passes through the housing side supply opening 26 and is supplied to the outside oil reservoir space 8b. Since the housing side supply opening 26 is opposed to the outside small diameter portion 61b of the semi-floating metal bearing 6, the oil supplied from the housing side supply opening 26 to the outside oil reservoir space 8b hits the outside small diameter portion 61b and its flowing direction is changed. Since the outside oil reservoir space 8b is filled with the oil, a main flow of the oil, in which most of the oil flows even though not forming a fast flow, flows toward the supply opening 61c along the oil supply path FL.

Meanwhile, minute foreign matter CT contained in the oil taps into the flow of the oil and is conveyed from the oil feed passage 25 to the outside oil reservoir space 8b through the housing side supply opening 26. As described previously, the flowing direction of the oil supplied to the outside oil reservoir space 8b is changed substantially at a right angle along the oil supply path FL. Here, the minute foreign matter CT contained in the oil has a higher specific gravity than the oil. Accordingly, the minute foreign matter CT does not follow the change in the flowing direction of the oil but falls along the outer peripheral surface of the outside small diameter portion 61b by inertia. Hence, the minute foreign matter CT moves downward in FIG. 2 (in a direction from the housing side supply opening 26 toward the thrust pin 7). The minute foreign matter CT moving downward is retained in a lower part of the outside oil reservoir space 8b.

As a result of applying the above-described configuration, a portion near an outlet of the housing side supply opening 26, part of the outside small diameter portion 61b opposed to the housing side supply opening 26, and part of the outside oil reservoir space 8b located in between collectively function as a removal section RA for separating the minute foreign matter CT from the oil. Meanwhile, the lower part of the outside oil reservoir space 8b functions as a retaining region SA which retains the minute foreign matter CT separated from the oil, so as to prevent the minute foreign matter CT from mixing again with the oil which flows toward the supply opening 61c. In the meantime, the part of the outside oil reservoir space 8b joining the removal section RA and the retaining region SA functions as a conveyance path TA, which causes the minute foreign matter CT separated by the removal section RA to move from the removal section RA to the retaining region SA. Accordingly, the retaining region SA and the conveyance path TA function as a collecting section which collects the minute foreign matter CT separated from the oil in the removal section RA, so as to prevent the minute foreign matter CT from mixing again with the oil which flows toward the supply opening 61c.

As described above, in this embodiment, the oil supply path FL is provided with the removal section RA which is configured to separate the minute foreign matter CT in the oil by changing the flowing direction of the oil. Thus, it is possible to remove the minute foreign matter CT in the oil without providing a filter on the oil supply path FL. Since the minute foreign matter CT is separated by changing the flowing direction of the oil without using the filter, a supply pressure of the oil supplied to the fluid bearing is not reduced more than needed, and hence the function of the fluid bearing is not blocked. Meanwhile, the minute foreign matter CT separated from the oil is collected by the conveyance path TA and the retaining region SA which serve as the collecting section, so as to prevent the minute foreign matter CT from mixing again with the oil that flows toward the supply opening 61c configured to supply the oil to a space (i.e., an inner bearing section) between the large diameter portions 52 and 53 as well as the inside small diameter portions 62a and 63a. Thus, it is possible to inhibit the minute foreign matter CT from mixing again with the oil and flowing toward the inner bearing section.

As described above, in this embodiment, the retaining region SA which retains the minute foreign matter CT separated from the oil by the removal section RA so as to prevent the minute foreign matter CT from mixing again with the oil that flows toward the supply opening 61c, and the conveyance path TA which causes the minute foreign matter CT separated by the removal section RA to move from the removal section RA to the retaining region SA, are formed collectively as the collecting section. As shown in FIG. 2, the conveyance path TA is joined to the removal section RA at a position which is different from the main flow path (a flow path along the arrow indicated in FIG. 2 as the oil feed passage) on which the oil flows from the removal section RA toward the supply opening 61c. Specifically, in the example shown in FIG. 2, the main flow path extends from the left side of the removal section RA in the drawing, while the conveyance path TA extends from a portion below the removal section RA in the drawing.

The retaining region SA which retains the minute foreign matter CT so as to prevent the minute foreign matter CT from mixing again with the oil flowing toward the supply opening 61c, and the conveyance path TA which causes the minute foreign matter CT to move from the removal section RA to the retaining region SA, are formed as described above. Accordingly, it is possible to locate the removal section RA securely away from the retaining region SA and thereby to surely retain the removed minute foreign matter CT. In addition, the conveyance path TA is joined to the removal section RA at the position different from the main flow path on which the oil flows from the removal section RA toward the supply opening 61c. Thus, it is possible to guide the minute foreign matter CT, which has been separated from the oil flowing on the main flow by the removal section RA, to the retaining region SA through the conveyance path TA without returning the minute foreign matter CT to the main flow path side.

Moreover, in this embodiment, the outside oil reservoir space 8b configured to temporarily retain the oil is formed between the bearing housing 2 and the semi-floating metal bearing 6. In addition, the retaining region SA and the conveyance path TA are formed in the outside oil reservoir space 8b.

Since the conveyance path TA and the retaining region SA are formed in the outside oil reservoir space 8b as described above, it is possible to downsize the turbocharger TC and to form the conveyance path TA and the retaining region SA closer to the supply opening 61c. As a consequence, the removal section RA can also be located closer to the supply opening 61c, so that the minute foreign matter CT can be separated from the oil at a position closer to the supply opening 61c. Since the minute foreign matter CT is separated from the oil at the position closer to the supply opening 61c, it is possible to minimize a possibility of the entry of minute foreign matter CT which occurs between the removal section RA and the supply opening 61c.

In this embodiment, the retaining region SA is formed below the removal section RA and the supply opening 61c.

By locating the retaining region SA below the removal section RA, it is possible to achieve the configuration to cause the minute foreign matter CT separated by the removal section RA to fall by its own weight along the outer peripheral surface of the outside small diameter portion 61b, and to surely gather in the retaining region SA. In addition, although the retaining region SA is formed in the outside oil reservoir space 8b, the minute foreign matter CT retained in the retaining region SA can even more surely be inhibited from moving toward the supply opening 61c since the retaining region SA is located below the supply opening 61c.

In this embodiment, the removal section RA includes a separation wall surface which is opposed to the flow of the oil supplied from the upstream side. Here, a portion of the outside small diameter portion 61b in the removal section RA, which is the portion of the outer peripheral surface of the semi-floating metal bearing 6 opposed to the housing side supply opening 26, corresponds to the separation wall surface in the above-described embodiment.

As described above, the removal section RA has the separation wall surface and the separation wall surface is located opposite the flow of the oil supplied from the upstream side. Accordingly, the entire flow of the oil supplied from the upstream side can surely be changed.

Furthermore, since the separation wall surface is formed on the outer peripheral surface of the semi-floating metal bearing 6, it is possible to form the smaller turbocharger TC as compared to the case of additionally providing an independent wall surface, and moreover, to separate the minute foreign matter CT from the oil at the position closer to the supply opening 61c.

In this embodiment, the separation wall surface is formed by locating the housing side supply opening 26 and the supply opening 61c at different positions. Since the separation wall surface is formed by locating the housing side supply opening 26 and the supply opening 61c at the different positions as described above, the separation wall can be formed easily and surely on the outer peripheral surface of the semi-floating metal bearing 6.

Figure 3:
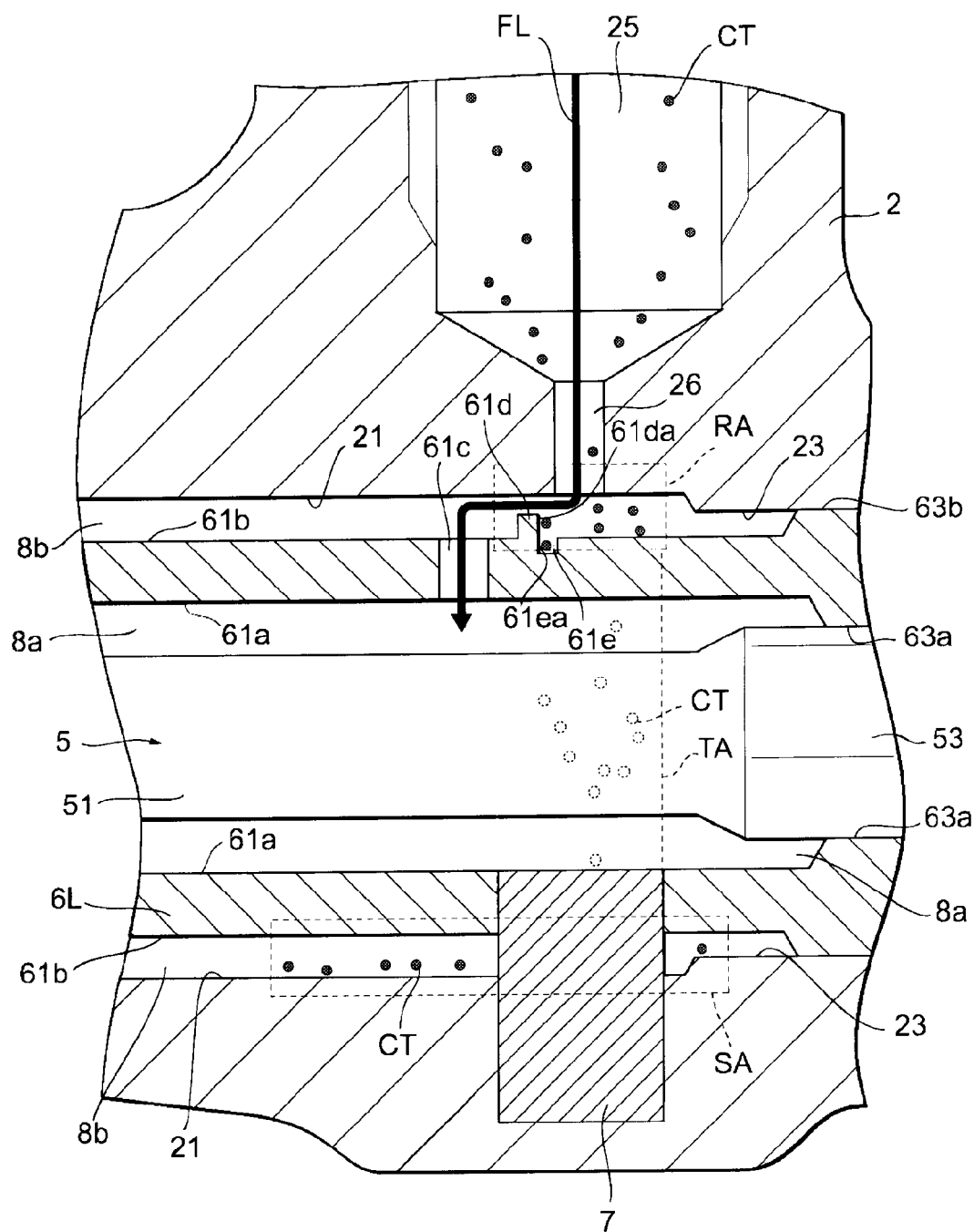
FIG. 3 is an enlarged cross-sectional view showing a first modified example of the embodiment depicted in FIG. 2.

Next, a first modified example of the embodiment will be described with reference to FIG. 3. FIG. 3 is an enlarged cross-sectional view showing the first modified example of the invention depicted in FIG. 2. The modified example shown in FIG. 3 uses a semi-floating metal bearing 6L which is prepared by providing the semi-floating metal bearing 6 with a guide protrusion 61d and a guide recess 61e.

The guide protrusion 61d is formed in the removal section RA. To be more precise, the guide protrusion 61d is provided in the vicinity of the supply opening 61c and beside the housing side supply opening 26. A surface of the guide protrusion 61d directed to the housing side supply opening 26 forms a guide wall surface 61da. Even if the minute foreign matter CT tries to flow toward the supply opening 61c, the minute foreign matter CT is blocked by the guide wall surface 61da and is guided toward the conveyance path TA.

The guide recess 61e is formed in the removal section RA. To be more precise, the guide recess 61e is provided in the vicinity of the supply opening 61c and beside the housing side supply opening 26, and is adjacent to the housing side supply opening 26 side of the guide protrusion 61d. A surface of the guide recess 61e directed to the housing side supply opening 26 forms a guide wall surface 61ea. Even if the minute foreign matter CT tries to flow toward the supply opening 61c, the minute foreign matter CT is blocked by the guide wall surface 61ea and is guided toward the conveyance path TA.

Although both the guide protrusion 61d and the guide recess 61e are provided in this example, it is possible to provide any one of the guide protrusion 61d and the guide recess 61e instead.

Figure 4:
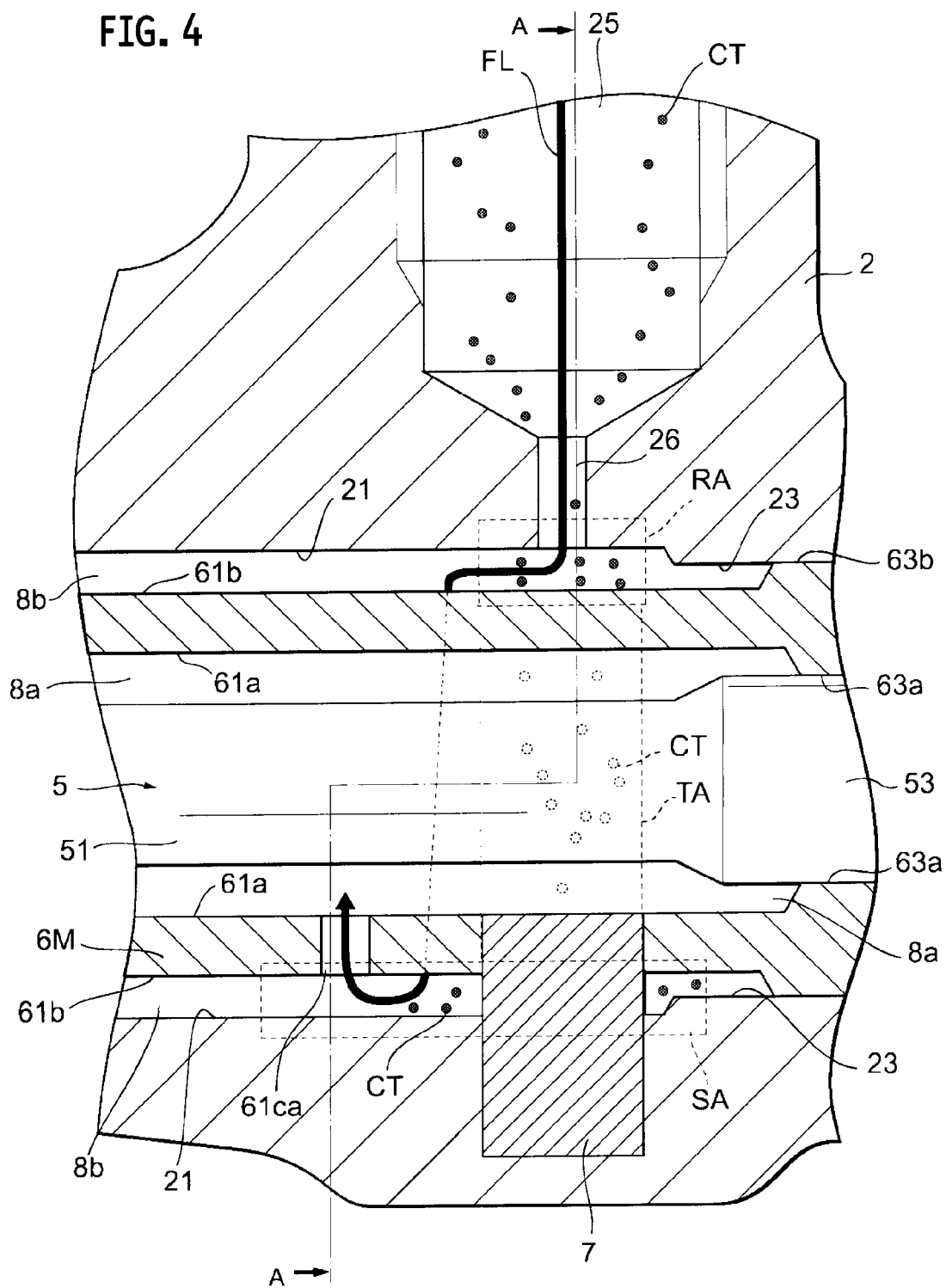
FIG. 4 is an enlarged cross-sectional view showing a second modified example of the embodiment depicted in FIG. 2.
Figure 5:
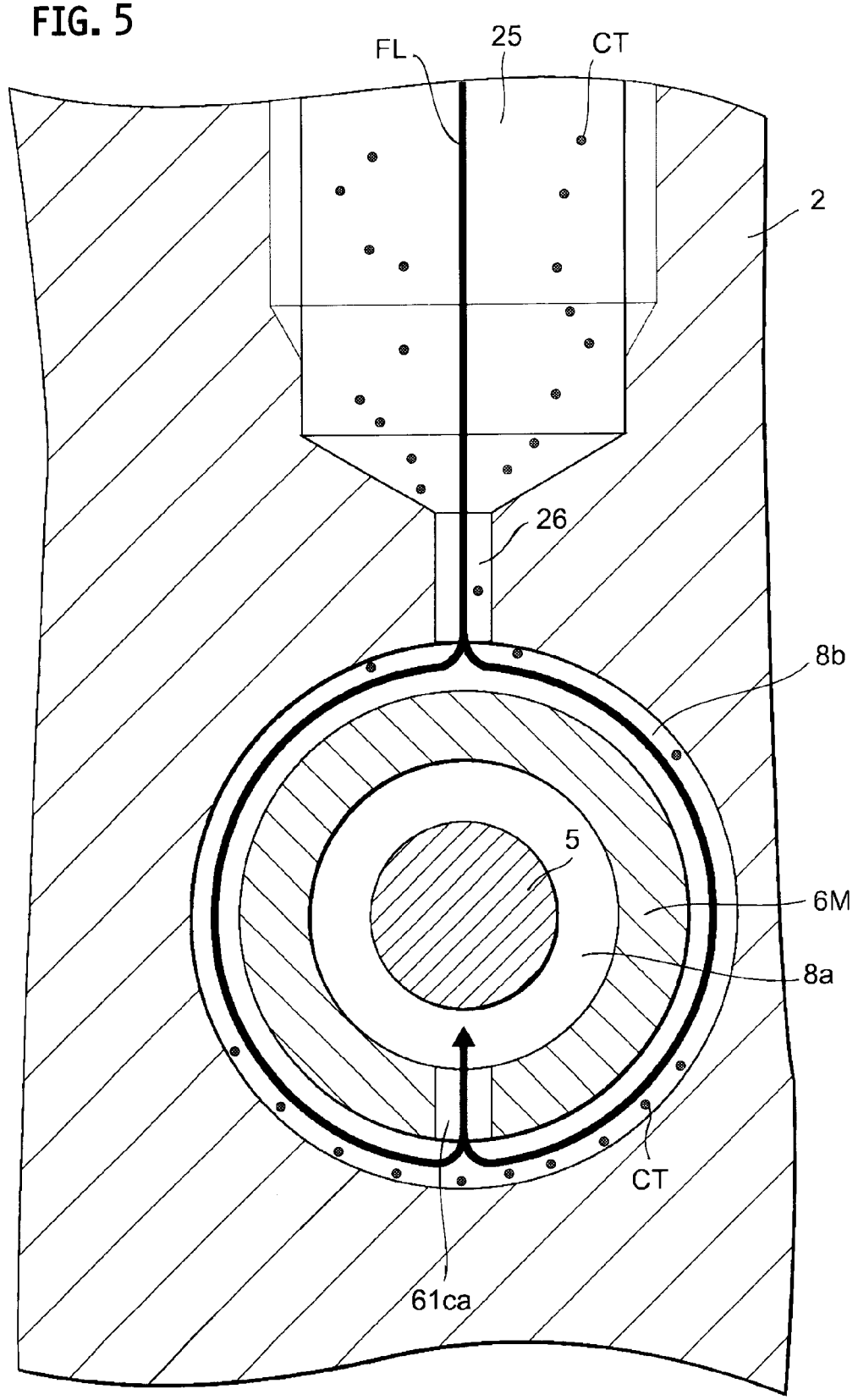
FIG. 5 is a vertical sectional view showing an A-A cross section in FIG. 4.

Next, a second modified example of the embodiment will be described with reference to FIG. 4 and FIG. 5. FIG. 4 is an enlarged cross-sectional view showing the second modified example of the embodiment depicted in FIG. 2. FIG. 5 is a cross-sectional view showing an A-A cross section in FIG. 4. The modified example shown in FIG. 4 and FIG. 5 uses a semi-floating metal bearing 6M which is prepared by changing the position of the supply opening 61c of the semi-floating metal bearing 6.

A supply opening 61ca of the semi-floating metal bearing 6M is provide on the side opposite of the rotating shaft 5 from the housing side supply opening 26. As shown in FIG. 5, the minute foreign matter CT going into the outside oil reservoir space 8b from the housing side supply opening 26 slips along the outside of the semi-floating metal bearing 6M and is retained at the bottom of the outside oil reservoir space 8b. The supply opening 61ca of the semi-floating metal bearing 6M is formed at a lower part of the semi-floating metal bearing 6M. Accordingly, the oil supply path FL goes upward into the inside oil reservoir space 8a at this part. The oil supply path FL runs relatively close to the retaining region SA where the minute foreign matter CT is retained. Nonetheless, the oil supply path FL is designed to pass above the retaining region SA so as not to bring in the minute foreign matter CT. Furthermore, the flowing direction of the oil supply path FL is arranged in such a way as to run relatively close to the retaining region SA and then to go upward into the inside oil reservoir space 8a. Thus, it is possible to reduce the bringing in of the minute foreign matter CT more effectively.

Figure 6:
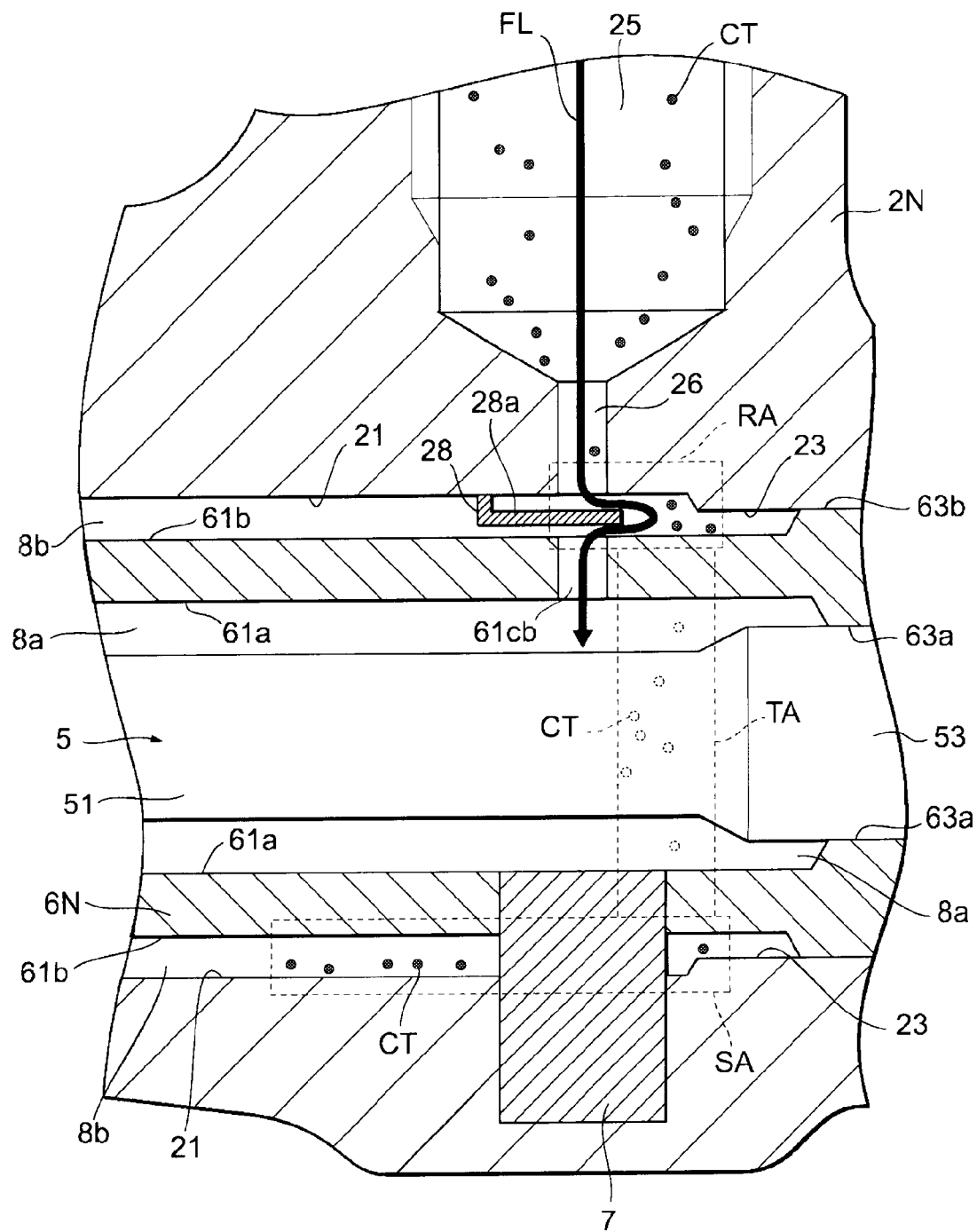
FIG. 6 is an enlarged cross-sectional view showing a third modified example of the embodiment depicted in FIG. 2.

Next, a third modified example of the embodiment will be described with reference to FIG. 6. FIG. 6 is an enlarged cross-sectional view showing the third modified example of the embodiment depicted in FIG. 2. The modified example shown in FIG. 6 uses a semi-floating metal bearing 6N which is prepared by changing the position of the supply opening 61c of the semi-floating metal bearing 6, and a bearing housing 2N which is prepared by providing the bearing housing 2 with a separation wall member 28.

A supply opening 61cb of the semi-floating metal bearing 6N is provided at a position in front of the housing side supply opening 26. The bearing housing 2N is provided with the separation wall member 28. The separation wall member 28 is an L-shaped component which is provided on the housing inner wall 21. The separation wall member 28 is provided in such a way as to intervene between the housing side supply opening 26 and the supply opening 61cb. Accordingly, a separation wall surface 28a of the separation wall member 28 is provided opposite to the housing side supply opening 26.

The oil going into the outside oil reservoir space 8b from the housing side supply opening 26 hits the separation wall surface 28a of the separation wall member 28 and then meanders. Thereafter, the oil hits the outside small diameter portion 61b, which is the outer peripheral surface of the semi-floating metal bearing 6N, and flows toward the supply opening 61cb. During this meandering process, the minute foreign matter CT is separated from the flow of the oil. Accordingly, the removal section RA includes the separation wall surface 28a. The minute foreign matter CT separated from the flow of the oil by the removal section RA passes through the conveyance path TA and is retained in the retaining region SA.

Figure 7:
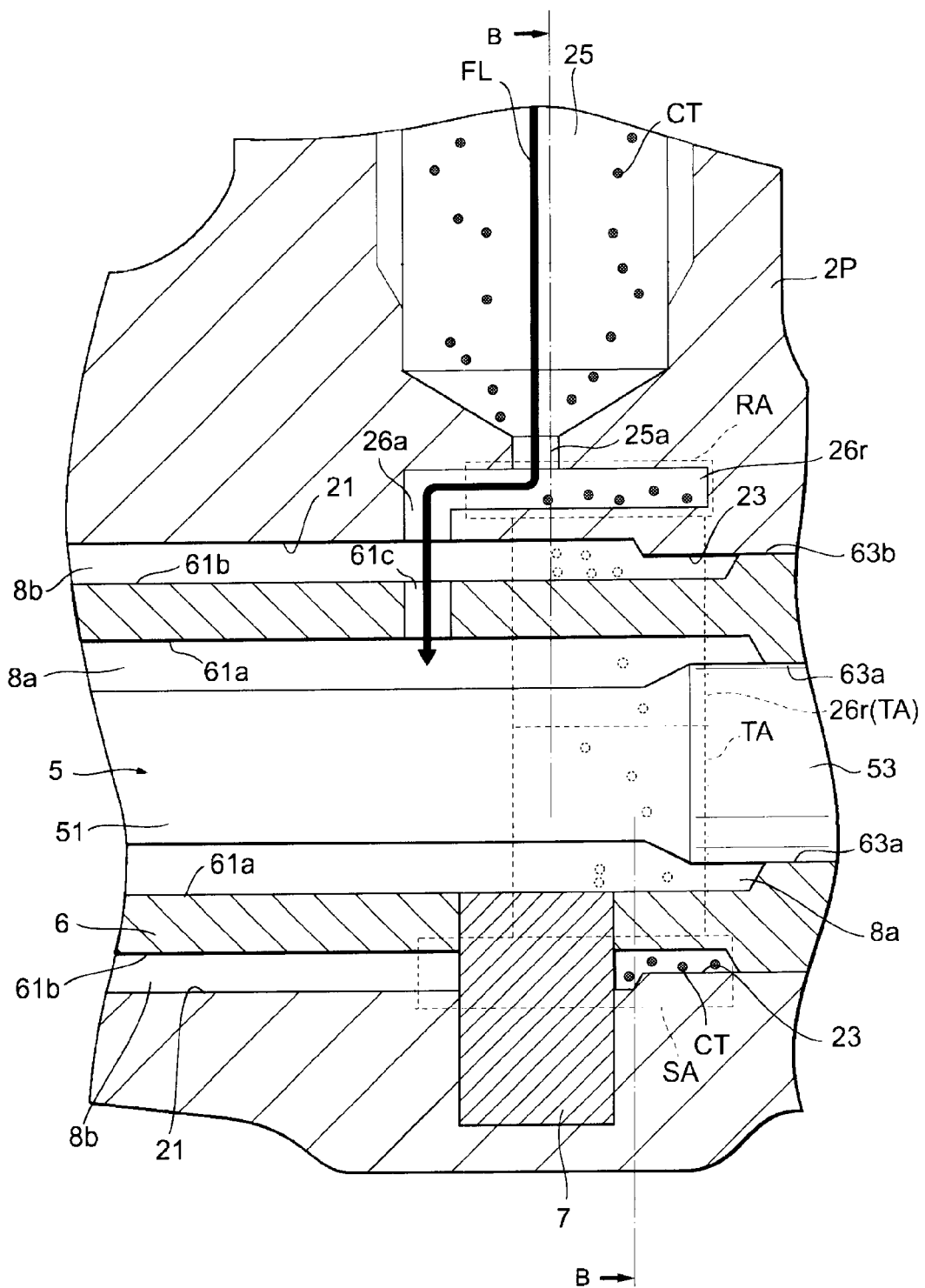
FIG. 7 is an enlarged cross-sectional view showing a fourth modified example of the embodiment depicted in FIG. 2.
Figure 8:
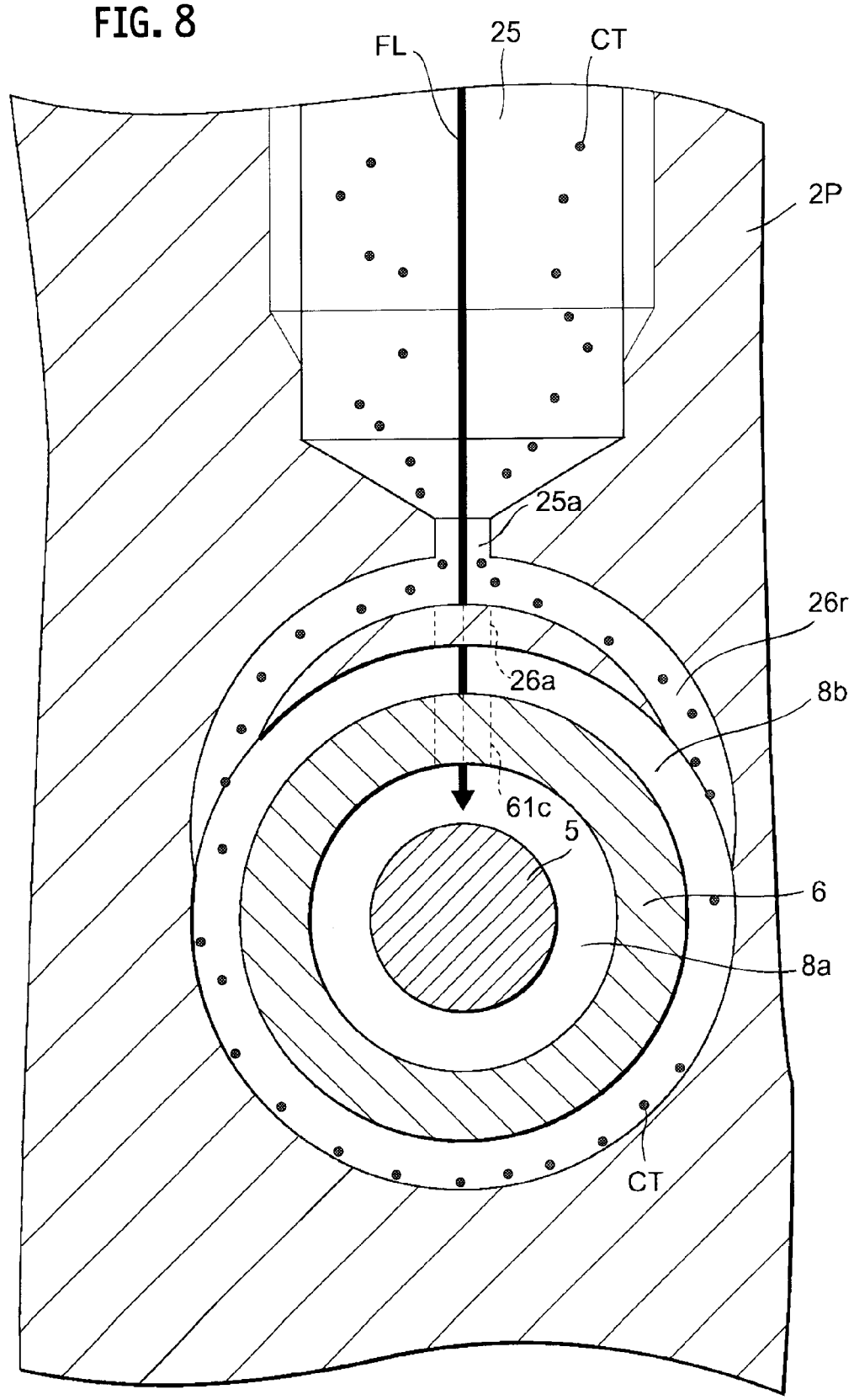
FIG. 8 is a vertical sectional view showing a B-B cross section in FIG. 7.

Next, a fourth modified example of the embodiment will be described with reference to FIG. 7 and FIG. 8. FIG. 7 is an enlarged cross-sectional view showing the fourth modified example of the embodiment depicted in FIG. 2. FIG. 8 is a cross-sectional view showing a B-B cross section in FIG. 7. The modified example shown in FIG. 7 and FIG. 8 uses a bearing housing 2P which is prepared by changing an internal flow path in the bearing housing 2.

A housing side supply opening 26a of the bearing housing 2P is provided opposite to the supply opening 61c of the semi-floating metal bearing 6. A separation chamber 26r is formed between the oil feed passage 25 and the housing side supply opening 26a of the bearing housing 2P. When viewed in the direction of illustration in FIG. 7, an end portion 25a of the oil feed passage 25 is joined to a portion near the center of the separation chamber 26r. Meanwhile, the housing side supply opening 26a is joined to one end portion of the separation chamber 26r. Accordingly, the oil supplied to the separation chamber 26r hits a bottom surface of the separation chamber 26r, whereby the flowing direction of the oil is changed. Hence, the oil flows to the housing side supply opening 26a and then to the supply opening 61c directly. The above-described flow of the oil defines the oil supply path FL that extends from the oil feed passage 25 to the inside oil reservoir space 8a.

To be more precise, the oil supplied from the oil feed passage 25 is passed through the end portion 25a and is supplied to the separation chamber 26r. Since the end portion 25a of the oil feed passage 25 is opposed to the bottom surface of the separation chamber 26r, the supplied oil hits the bottom surface of the separation chamber 26r and its flowing direction is changed. Since the separation chamber 26r is filled with the oil, a main flow of the oil, in which most of the oil flows even though not forming a fast flow, flows toward the housing side supply opening 26a and the supply opening 61c along the oil supply path FL.

Meanwhile, the minute foreign matter CT contained in the oil taps into the flow of the oil and is conveyed from the oil feed passage 25 to the separation chamber 26r. As described previously, the flowing direction of the oil supplied to the separation chamber 26r is changed substantially at a right angle along the oil supply path FL. In this example, the other end of the separation chamber 26r from the one end portion where the housing side supply opening 26a is formed is joined to the outside oil reservoir space 8b without using the housing side supply opening 26a (see FIG. 8). The minute foreign matter CT contained in the oil has a higher specific gravity than the oil. Accordingly, the minute foreign matter CT does not follow the change in the flowing direction of the oil but falls along the bottom surface of the separation chamber 26r by inertia. Hence, the minute foreign matter CT moves to the outside oil reservoir space 8b. Thereafter, the minute foreign matter CT moving downward is retained in the lower part of the outside oil reservoir space 8b.

In this modified example, an upper portion of the separation chamber 26r functions as the removal section RA. As described above, the minute foreign matter CT separated from the flow of the oil at the upper portion of the separation chamber 26r reaches the outside oil reservoir space 8b via the separation chamber 26r. Accordingly, a lower portion of the separation chamber 26r and part of the outside oil reservoir space 8b collectively function as the conveyance path TA.

The embodiment of the present invention has been described with reference to specific examples. It is to be noted, however, that the present invention is not limited only to these specific examples. In other words, a person skilled in the art can add design changes to any of these specific examples as appropriate, and such changes are also encompassed by the scope of the present invention as long as the changed examples retain the features of the present invention. For example, the elements included in any of the above-described examples, as well as layouts, materials, conditions, shapes, sizes, and the like of the elements are not limited only to those specified in the examples but can be changed as appropriate. In addition, any elements in the above-described examples can be used in combination as long as such combinations are technically feasible. Such combinations are also encompassed by the scope of the present inventions as long as the combined examples retain the features of the present invention.

What is claimed is:

1. A turbocharger comprising:
   a turbine wheel constituting a turbine;
   a compressor wheel constituting a compressor;
   a rotating shaft connecting the turbine wheel and the compressor wheel to each other;
   a housing which houses at least the rotating shaft; and
   a semi-floating metal bearing forming a fluid bearing between the rotating shaft and the housing, wherein
   an oil reservoir space is formed between the housing and the semi-floating metal bearing to temporarily retain oil,
   the housing is provided with a first supply opening configured to supply oil to the oil reservoir space,
   the semi-floating metal bearing is provided with a second supply opening configured to supply oil in the oil reservoir space to an inner bearing section formed between the semi-floating metal bearing and the rotating shaft,
   the first supply opening and the second supply opening are located at different positions in an axial direction of the rotating shaft,
   a separation wall surface is provided at a position at an outer peripheral surface of the semi-floating metal bearing, and is opposed to the first supply opening, and
   an outer diameter of the outer peripheral surface of the semi-floating metal bearing is constant from a position opposed to the first supply opening to the second supply opening.

2. The turbocharger according to claim 1, wherein
   an oil supply path extending from inside of the housing to the second supply opening is formed to feed oil to be supplied to the inner bearing section,
   the separation wall surface is provided in the oil supply path,
   a collection section is provided to collect minute foreign matter separated by the separation wall surface so as to prevent the minute foreign matter from mixing again with the oil flowing toward the second supply opening,
   the collecting section comprises:
      a retaining region configured to retain the minute foreign matter separated by the separation wall surface so as to prevent the minute foreign matter from mixing again with the oil flowing toward the second supply opening; and
      a conveyance path configured to move the minute foreign matter, separated by the separation wall surface, from the separation wall surface to the retaining region, and
   the conveyance path is joined to the separation wall surface at a position different from a main flow path on which the oil flows from the separation wall surface toward the second supply opening.

3. The turbocharger according to claim 2, wherein the retaining region and the conveyance path are formed in the oil reservoir space.

4. The turbocharger according to claim 3, wherein the retaining region is formed below the separation wall surface and the second supply opening.

5. A turbocharger, comprising:
a turbine wheel constituting a turbine;
a compressor wheel constituting a compressor;
a rotating shaft connecting the turbine wheel and the compressor wheel to each other: a housing which houses at least the rotating shaft; and
a semi-floating metal bearing forming a fluid bearing between the rotating shaft and the housing, wherein
an oil reservoir space is formed between the housing and the semi-floating metal bearing to temporarily retain oil,
the housing is provided with a first supply opening configured to supply oil to the oil reservoir space,
the semi-floating metal bearing is provided with a second supply opening configured to supply oil in the oil reservoir space to an inner bearing section formed between the semi-floating metal bearing and the rotating shaft, and
the second supply opening of the semi-floating metal bearing is provided on an opposite side to the first supply opening across the rotating shaft, and is provided at a position lower than the rotating shaft,
wherein the semi-floating metal bearing is capable of minimizing entry of minute foreign matter into the inner bearing section without blocking a function of the semi-floating metal bearing.

\* \* \* \* \*